United States Patent [19]
Destryker et al.

[11] Patent Number: 5,254,648
[45] Date of Patent: * Oct. 19, 1993

[54] PROCESS FOR THE PREPARATION OF POLYTHIOPHENES AND ELECTRICALLY CONDUCTING DEVICES CONTAINING THEM

[75] Inventors: Elise Destryker, Sint-Pieters-Leeuw; Etienne Hannecart, Tervuren; Claude Franquinet, Brussels, all of Belgium

[73] Assignee: SOLVAY & CIE (Société Anonyme), Brussels, Belgium

[*] Notice: The portion of the term of this patent subsequent to Jun. 22, 2010 has been disclaimed.

[21] Appl. No.: 718,967

[22] Filed: Jun. 21, 1991

Related U.S. Application Data

[63] Continuation of Ser. No. 607,824, Nov. 1, 1990, abandoned, which is a continuation-in-part of Ser. No. 364,227, Jun. 12, 1989, abandoned.

[30] Foreign Application Priority Data

Nov. 17, 1989 [BE] Belgium .................... 8901230

[51] Int. Cl.$^5$ ............................................ C08G 75/06
[52] U.S. Cl. ........................................ 526/93; 252/519; 525/359.1; 526/206; 526/256; 528/377; 528/378; 528/380
[58] Field of Search ............... 526/93, 206, 256; 528/380, 378, 377; 252/519

[56] References Cited

U.S. PATENT DOCUMENTS 4,640,748 2/1987 Wudl et al. .................. 204/59 R
4,731,311 3/1988 Suzuki et al. ................ 429/213

FOREIGN PATENT DOCUMENTS 0253594 1/1988 European Pat. Off. .
0350083 1/1990 European Pat. Off. .
1178529 9/1964 Fed. Rep. of Germany .
62-106923 5/1987 Japan .
2106923 5/1987 Japan .
1000679 4/1964 United Kingdom .

OTHER PUBLICATIONS

"The Merck Index", 11th Ed., 2141 (1989) Merck (Rahway).
Toatsu Chemicals, Inc., Chemical Abstracts, vol. 107, No. 22, Nov. 30, 1987, p. 19, "Synthetic High Polymers", Columbus, Ohio, U.S. No. 199191u, JP-A-62/109,821.
Komatsu K.K., Chemical Patents Index, Basic Abstracts Journal, sec. A: "PLASDOC", No. 87-296,490, Dec. 16, 1987, Derwent Pub. Ltd., London, GB, JP-A-62/209,130.
Mitsui Toatsu Chem., Inc., Patent Abstract of Japan, vol. 11, No. 317 (C-452) [2764] Oct. 15, 1987, "Production of Five-Membered Heterocyclic Compound Polymer", JP-A-62/106,923.

*Primary Examiner*—Joseph L. Schofer
*Assistant Examiner*—Fred Zitomer
*Attorney, Agent, or Firm*—Spencer, Frank & Schneider

[57] ABSTRACT

The invention relates to a process for the preparation of electrically conducting polymers based on polythiophenes by chemical polymerization of thiophene by means of a ferric salt, an alkyl halide and water.

The invention also relates to the electrically conducting devices containing the polythiophenes obtained and a thermoplastic polymer.

20 Claims, No Drawings

PROCESS FOR THE PREPARATION OF POLYTHIOPHENES AND ELECTRICALLY CONDUCTING DEVICES CONTAINING THEM

This Application is a Continuation of U.S. Pat. Application No. 07/607,824 filed Nov. 1st, 1990 and is a Continuation-In-Part of U.S. Pat. Application No. 07/364,227 field Jun. 12th, 1989, both now abandoned.

BACKGROUND OF THE INVENTION

1. Field of the Invention

The present invention relates to a process for the preparation of electrically conducting polymers based on polythiophenes by chemical polymerizaiton of thiophene in the presence of water and alkyl halide.

2. Background of the Invention

A process for the preparation of electrically conducting polymers based on polythiophenes by chemical polymerization of thiophene in a reaction medium comprising a ferric salt, an alkyl halide and water has been proposed in French Patent Application No. 88.07976.

SUMMARY OFT HE INVENTION

A process for the preparation of polythiophenes by chemical polymerization of thiophene has now been found which enables conducting polymers having even better electrical conductivity properties to be obtained. These properties are obtained while preserving the other characteristics mentioned in the abovementioned patent application, that is to say a degree of conversion of the conducting polymers, homogeneous polymers and a satisfactory thermal stability.

The polythiophenes thus obtained are used easily. Moreover, after using mixtures of polythiophene and resins such as polyvinyl chloride or polyethylene, the composites obtained have a good dispersion and a satisfactory mechanical strength.

To this end, the present invention relates to a process for the preparation of electrically conducting polymers based on polythiophenes by chemical polymerization of thiophene in a reaction medium comprising a ferric salt, an alkyl halide and water, the amount of alkyl halide used being less than 0.04 litre per g of thiophene.

DESCRIPTION OF THE PREFERRED EMBODIMENTS

Polythiophene is understood to be any polymer containing recurring units of unsubstituted thiophene and whatever its molecular weight.

An alkyl halide comprising 1 to 10 carbon atoms is generally used in the reaction medium. Customarily, a straight-chain or branched alkyl halide containing 1 to 8 carbon atoms is used, the halide being a chloride or a fluoride. Preferably, a straight-chain alkyl chloride containing 1 to 4 carbon atoms is used. Particularly preferentially, chloroform or methylene chloride is used.

The amount of alkyl halide used in the process according to the invention is generally between 0.001 and 0.04 litre per g of thiophene, customarily between 0.004 and 0.04 litre per g of thiophene and preferably between 0.008 and 0.04 litre per g of thiophene.

A ferric salt is used in the reaction medium as a doping agent and agent inducing polymerization. Generally an organic or inorganic ferric salt is used. Customarily an inorganic ferric salt such as a chloride, a sulphate or a nitrate is used. Preferably, ferric chloride is used. The ferric salt can be introduced in the anhydrous or hydrated form, the water introduced by the hydrated ferric salt forms part of the reaction medium and is taken into account for calculation of the ratios with the other additives.

The molar ratio between the ferric salt and the thiophene used in the process according to the invention is generally between 2.5 and 20. Customarily, this ratio is between 5 and 15 and preferably between 8 and 12.

The molar ratio between the water and the ferric salt is an important characteristic for the invention. This ratio is generally between 0.01 and 6, customarily between 0.1 and 5 and preferably between 0.3 and 4.

The amount of water in the process according to the invention is generally between 0.009 and 900% by weight of alkyl halide, customarily between 0.01 and 500% and preferably between 0.3 and 250% by weight of alkyl halide.

The chemical polymerization reaction is customarily carried out under an air or nitrogen atmosphere and preferably under a nitrogen atmosphere.

The temperature at which the polymerization process is carried out is generally between 0° and 25° C., customarily between 2° and 20° C. and preferably between 5° and 15° C. when operating at atmospheric pressure.

The pressure at which the process is carried out is generally between 0.1 and 10 bars and it is preferably atmospheric pressure.

The process according to the invention can advantageously be carried out following the following steps:

during a first step a fraction of the amount of alkyl halide necessary and the ferric salt are introduced into the reactor under a nitrogen atmosphere;

during a second step the appropriate amount of water and the thiophene dissolved in the necessary amount of alkyl halide are added, with stirring, a polymer being obtained; and during a third step the polymer obtained is washed and then dried.

During the second step it is particularly advantageous to introduce the water and the thiophene dissolved in the alkyl halide in a continuous and regular manner.

During the third step the polymer obtained is preferably washed with acetonitrile.

The process according to the invention can be carried out in any equipment or any reactor which enables the operating conditions described above to be combined.

The polythiophenes obtained by the process of the invention can be easily dispersed in diverse polymer resins and used easily. In fact, the polythiophenes and their mixtures with thermoplastic polymers, such as polyvinyl chloride or polyethylene in particular, can be punched hot to obtain composite sheets or articles. These composite sheets or articles have a good mechanical strength and, in contrast to composite articles produced with polythiophenes obtained by electrochemical means, possess a high residual electrical conductivity which is stable over time. These composite sheets or articles are homogeneous because the polythiophenes are well dispersed therein.

The composite sheets or articles can be loaded, in particular, with glass fibres, carbon black, calcium carbonate or metal particles.

The invention therefore also relates to compositions comprising the polythiophenes and one or more thermoplastic polymers, as well as electrically conducting devices comprising these compositions.

Finally, the polythiophenes and the compositions comprising polythiophenes obtained by the process of the invention can be used for their electrical conductivity, electromagnetic absorption and thermal conductivity properties and, more particularly, in order to produce electrically conducting devices.

The invention is illustrated by the following examples.

EXAMPLE 1

The reactor used is a 5-necked 3 l round-bottomed flask; each neck being fitted, respectively, with a 3-way tap, a thermometer and a septum enabling insertion of needles connected to metering pumps.

This round-bottomed flask, fitted with a stirrer, is placed in a thermostatic bath and is purged by a cycle comprising 3 applications of vacuum and 2 flushings with pure and dry nitrogen.

750 ml of chloroform, previously degassed with nitrogen, are then introduced into this round-bottomed flask, which is kept at 10° C. under nitrogen, and 546 g of anhydrous ferric chloride are then added, with stirring.

A 500 ml vessel is then filled, under nitrogen, with 250 ml of chloroform and 28.4 g of distilled and degassed thiophene.

In parallel, with the aid of metering pumps, 100 ml of water, in the course of 5 minutes, and the chloroform and the thiophene, contained in the vessel, in the course of 10 minutes, are introduced into the round-bottomed flask.

The round-bottomed flask is then kept for a further one hour at 10° C. with stirring, after which 750 ml of acetonitrile are introduced very slowly in the course of 80 minutes into this round-bottomed flask kept at 10° C.

The product is then filtered off at 20° C., under nitrogen.

The product obtained is washed 6 times with 500 ml of acetonitrile at 20° C. and then dried under dynamic vacuum at 20° C.

45 g of doped polythiophene which has a conductivity of 50 S.cm.$^{-1}$ and a degree of conversion:

$$\left[\frac{\text{polymer (polythiophene calculated as non-doped)}}{\text{monomer (thiophene)}}\right] \text{of } 90\%$$

are finally obtained.

EXAMPLE 2R (COMPARISON)

The reactor used is a 5-necked 3 l round-bottomed flask; each neck being fitted, respectively, with a 3-way tap, a thermometer and a septum enabling insertion of needles connected to metering pumps.

This round-bottomed flask, fitted with a stirrer, is placed in a thermostatic bath and is purged by a cycle comprising 3 applications of vacuum and 2 flushings with pure and dry nitrogen.

750 ml of chloroform, previously degassed with nitrogen, are then introduced into this round-bottomed flask, which is kept at 10° C. under nitrogen, and 546 g of anhydrous ferric chloride are then added, with stirring.

A 500 ml vessel is then filled, under nitrogen, with 250 ml of chloroform and 28.4 g of distilled and degassed thiophene.

The chloroform and the thiophene contained in the vessel are introduced, in the course of 10 minutes, into the round-bottomed flask with the aid of a metering pump.

The round-bottomed flask is then kept at 10° C. for a further one hour, with stirring, after which 250 ml of acetonitrile are introduced very slowly, in the course of 40 minutes, into this round-bottomed flask kept at 10° C.

The product is then filtered off at 20° C., under nitrogen.

The product obtained is washed 6 times with 250 ml of acetonitrile at 20° C. and then dried under dynamic vacuum at 20° C.

46 g of doped polythiophene which has a conductivity of 6 S.cm$^{-1}$ and a degree of conversion:

$$\left[\frac{\text{polymer (polythiophene calculated as non-doped)}}{\text{monomer (thiophene)}}\right] \text{of } 91\%$$

are finally obtained.

What is claimed is:

1. A process for the preparation of electrically conductive, doped polythiophene, the process comprising:
   a. polymerizing unsubstituted thiophene by a chemical route in a reaction medium comprised of:
      unsubstituted thiophene,
      a ferric salt which is effective as a doping agent and as an agent inducing polymerization and which is added to the reaction medium as an anhydrous ferric salt,
      an alkyl halide present in an amount of less than 0.04 liter per gram of thiophene, and
      water,
      wherein the water is introduced in an amount ranging between 0.009 and 900% by weight of the alkyl halide, and
      wherein the water and the anhydrous ferric salt are present in a molar ratio ranging between 0.01 and 6.

2. The process according to claim 1, wherein the water and the anhydrous ferric salt are present in a molar ratio ranging between 0.1 and 5.

3. The process according to claim 1, wherein the water is present in an amount ranging between 0.01 and 500% by weight of the alkyl halide.

4. The process according to claim 1, wherein the anhydrous ferric salt and the unsubstituted thiophene are present in a molar ratio ranging between 2.5 and 20.

5. The process according to claim 1, wherein the alkyl halide is selected from the group consisting of chloroform and methylene chloride.

6. The process according to claim 1, wherein polymerizing takes place at a temperature ranging between 0° and 25° C.

7. The process according to claim 1, wherein the process further comprises:
   a. introducing into a reactor under a nitrogen atmosphere a fraction of the alkyl halide, and the anhydrous ferric salt;
   b. adding to the reactor after step a and in parallel, and with stirring, the water and the unsubstituted thiophene, which unsubstituted thiophene is dissolved in a remaining fraction of the alkyl halide, and reacting under conditions effective to obtain the polythiophene; and
   c. recovering, washing, and drying the polythiophene.

8. The process according to claim 7, further comprising mixing the polymer obtained with a thermoplastic polymer to provide a mixture, and punching the mixture thus obtained while hot.

9. An electrically conductive device, comprising a polymer which is electrically conductive and which is obtained according to claim 1.

10. The electrically conductive device according to claim 9, further comprising at least one thermoplastic polymer.

11. A process for the preparation of electrically conductive, doped polythiophene, the process comprising:
  a. introducing into a reactor under a nitrogen atmosphere a fraction of an alkyl halide selected from the group consisting of chloroform and methylene chloride, and a ferric slat which is effective as a doping agent and as an agent inducing polymerization and which is added to the reactor as an anhydrous ferric salt;
  b. adding to the reactor after step a and in parallel, and with stirring, water and unsubstituted thiophene, which unsubstituted thiophene is dissolved in a remaining fraction of the alkyl halide, and reacting under conditions effective to polymerize the unsubstituted thiophene to obtain polythiophene; and
  c. recovering, washing, and drying the polythiophene obtained,
  wherein the water is introduced in an amount ranging between 0.009 and 900% by weight of the alkyl halide, and
  wherein the water and the anhydrous ferric salt are present in a molar ratio ranging between 0.01 and 6.

12. The process according to claim 11, wherein the water and the anhydrous ferric salt are present in a molar ratio ranging between 0.01 and 5.

13. The process according to claim 12, wherein the water is present in an amount ranging between 0.01 and 500% by weight of the alkyl halide.

14. The process according to claim 13, wherein the anhydrous ferric salt and the thiophene are present in a molar ration ranging between 2.5 and 20.

15. The process according to claim 11, wherein the anhydrous ferric salt and the thiophene are present in a molar ratio ranging between 2.5 and 20.

16. The process according to claim 8, wherein the thermoplastic polymer is selected from the group consisting of polyvinyl chloride and polyethylene.

17. The process according to claim 10, wherein the thermoplastic polymer is selected from the group consisting of polyvinyl chloride and polyethylene.

18. The process according to claim 3, wherein the anhydrous ferric salt and the thiophene are present in a molar ratio ranging between 2.5 and 20.

19. The process according to claim 11, wherein the reaction medium consists essentially of ingredients as recited hereinbefore.

20. The process according to claim 1, wherein the reaction medium consists essentially of ingredients as recited hereinbefore.

* * * * *